July 14, 1959
A. C. PETERSON
2,894,742
AUTOMOTIVE AIR SPRING MEANS
Filed Feb. 4, 1957
2 Sheets-Sheet 1
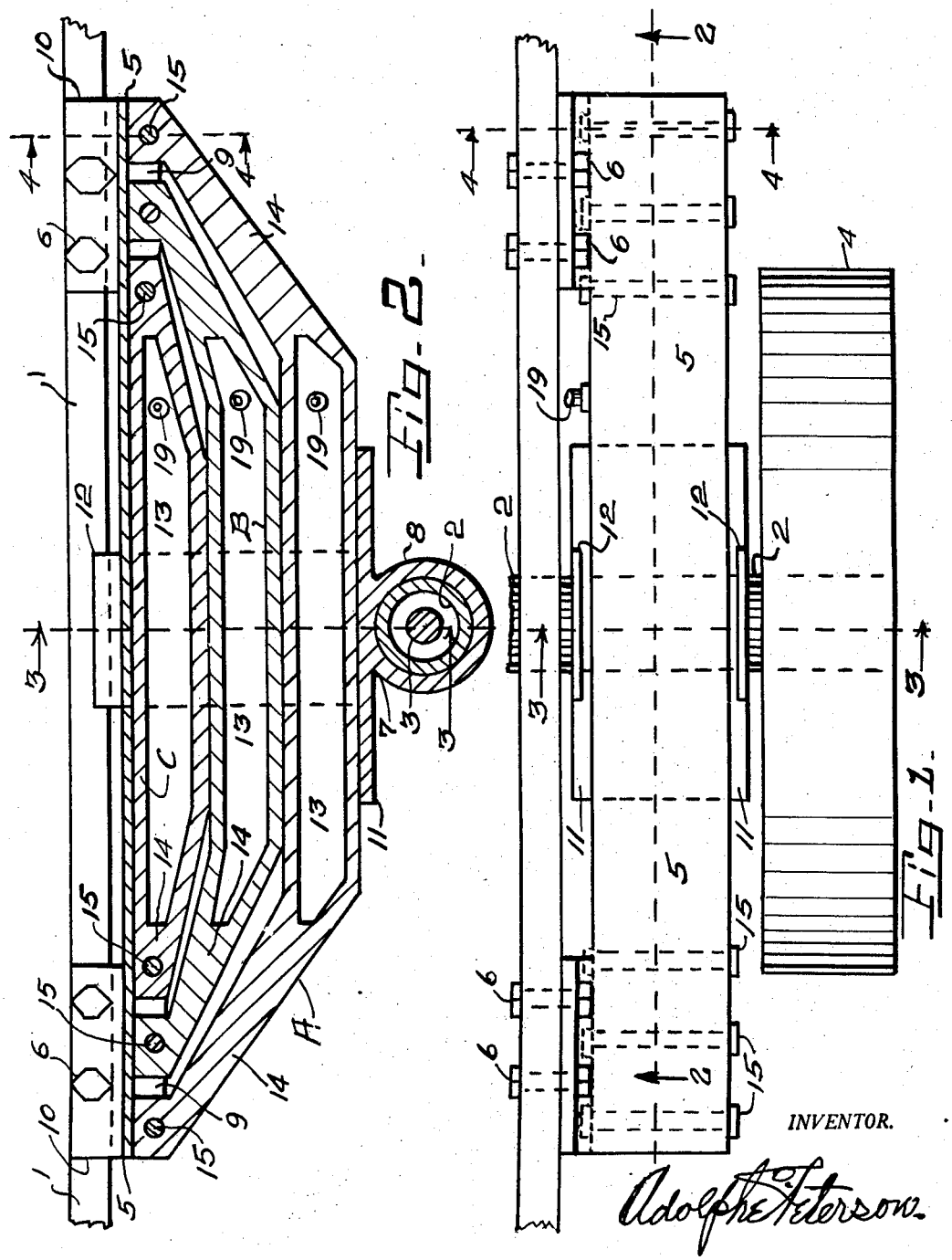
INVENTOR.
Adolphe Peterson July 14, 1959     A. C. PETERSON     2,894,742

AUTOMOTIVE AIR SPRING MEANS

Filed Feb. 4, 1957     2 Sheets-Sheet 2

INVENTOR.

Adolphe Peterson.

United States Patent Office 2,894,742
Patented July 14, 1959

2,894,742

AUTOMOTIVE AIR SPRING MEANS

Adolphe C. Peterson, Minneapolis, Minn.

Application February 4, 1957, Serial No. 638,169

9 Claims. (Cl. 267—65)

My invention relates to air spring devices such as are used for the suspension in automotive vehicles, generally, and it is called, automotive air spring means.

The chief objects of my invention, are to provide, a form of air spring means which is of such simple construction and easily manufactured form or units, that its manufacture would be less costly as compared with the means of such types, as are generally used, and so that accordingly, it could more readily be applied to the popular types of automobiles, without a prohibitive cost of such manufacture and application. Units for such a purpose have been rather complicated in form and not easily applied to automobiles, and a principal object is to provide a form of air spring which consists chiefly of a simple unit which can be as easily manufactured out of rubber or any similar plastic material or synthetic rubber material, as most simple articles of rubber are manufactured, so that the cost of the air spring unit itself, is therefore lowered and is not excessive as compared to the types of metal springs or air springs, which are generally used. An object is to provide a form of air spring means, which has such simplicity in its form and is so adaptable to application to a chassis, that its mounting in a chassis frame is simple and not costly, and so that its application on a chassis frame, can be performed by any person, in the event that any unit of such an air spring means becomes injured and does not perform its duty as such an air spring. In general the object is to improve upon spring means and in particular air spring means, such as are adaptable to the ordinary passenger car, the bus, the truck, or even rail cars.

The principal devices and combinations of devices comprising my invention are as hereinafter described and as defined in the appended claims. In the accompanying drawings, like characters refer to like parts throughout the views. Referring to the drawings:

Figure 1 is a plan view of my device, as applied to the axle or semi-axle supporting one road wheel of an automobile and showing merely an adjacent section of the one side rail of an automobile, as such frames are usually constructed, some parts being broken away, notably the chassis side rail, and the semi-axle or whole axle of an automobile.

Figure 2 is a view in vertical section on a plane drawn on the line 2—2 of Figures 1 and 3, this plane passing vertically and centrally through the principal components of the air spring means and transversely across the rigid axle and axle shaft of a wheel mounting means, some parts being broken away, and some parts being shown in full side elevation.

Figure 4 is a detail figure showing the mounting at one end of the air spring units, this section being on the lines 4—4 of Figures 1 and 2, this section representative of similar sections through other such mounting means of the air spring units, these being substantially similar.

Figure 3:
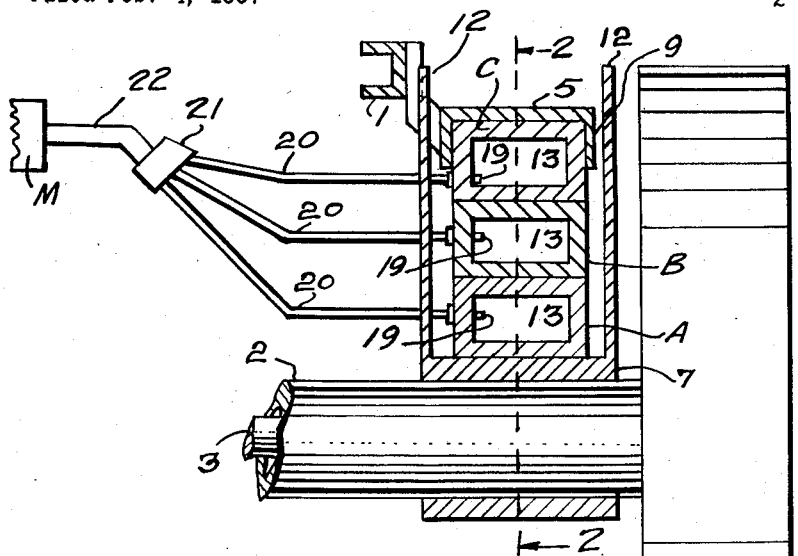
Figure 3 is a view in vertical cross section, at right angles to the section of Figure 2, this section being on the lines 3—3 of Figures 1 and 2, and being a section and plane passing vertically through the axis of the axle shaft and rigid axle supporting the one road wheel shown.
Figure 4:
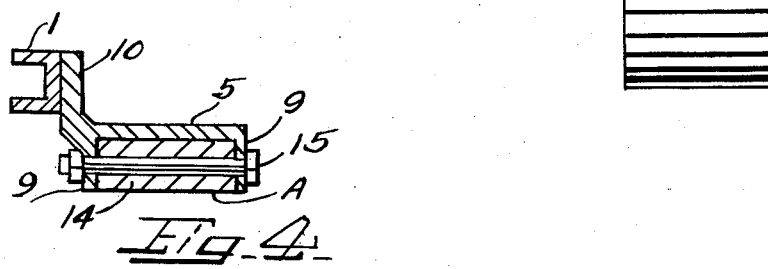

Referring first to Figures 1 to 4, both inclusive, there is here shown a mounting or application of my air spring means, and the application in this mounting, of three of the air spring units such as are a component part of the device, and this means is applied to merely a part of an automobile chassis, such as is necessary to show the application, of the device, as a spring means, to one road wheel of an automobile, it being contemplated that a similar device would be applied in a similar way, substantially, to the other wheels of an automobile. The chassis side rail is designated as 1, and 2 is the part of an automobile drive axle which is supported in any way in an automobile chassis to be held rigidly except that it is relatively vertically movable, and 3 is the axle shaft in this rigid axle part, and 4 is the road wheel applied to this axle, all of such means being shown only diagrammatically and in part, and being intended to be a component part of the usual wheel supporting means in an automobile and to have the usual components, such as radius rods or other means, such latter means being not shown, as the invention applies only to the air spring means and its mounting means between the chassis frame and the wheel axle, of whatever type the latter is.

The air spring means is applied to the chassis parts, designated, by means of a bracket means 5 rigidly attached to the side rail 1 by means of the bolts 6 or by welding or other means, and by means of an associated lower or axle bracket 7, the latter being slipped by its collar 8 over the semi-axle or full axle 2 and welded to the exterior of that axle part which is substantially of tubular construction, or being attached by any other means to that axle part so that the bracket when fixed in place, will not turn or slip from that position, substantially as shown. The bracket 5 is long in the direction, longitudinally of the chassis, say as much as thirty-five to forty inches long, preferably quite long, and will be little wider than the transverse width of the air spring units, as hereinafter described, and this bracket has on each of its sides a depending flange 9, these flanges, at each of their ends having bolt holes bored therein horizontally, to accommodate bolts as hereinafter described, this bracket having also vertically upwardly extended flanges 10 formed integrally therewith and by which the bracket may be attached to the side rail.

The axle bracket 7 has the collar 8 and has also a so-called platform 11, on which the lower air spring unit will rest, and has also a pair of upwardly extended vertical retaining guides, each of these being so long vertically that each will perform the retaining and guiding function, as hereinafter designated, and being rather wide, horizontally and longitudinally of the chassis frame, and being quite thin and being formed integrally with the bracket, the two guides, each designated 12 being placed parallel to each other and substantially as far apart and a little further apart, than the transverse horizontal width of the air spring units, to be described.

Figure 5:
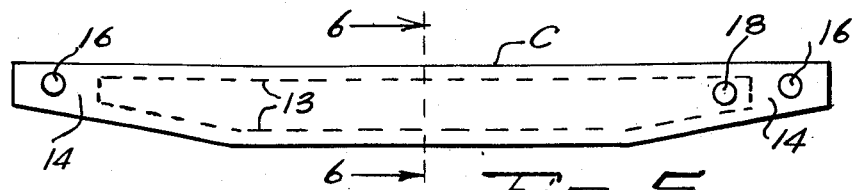
Figures 5 and 6 show the side view and a cross sectional view, respectively, of one air spring unit such as is a component part of my device, Figure 5 being on the same scale as one of these units in Figures 1 and 2, Figure 6 being on a somewhat larger scale to show the cord or textile woven base used in one of the units, this being representative of the construction in the units.
Figure 6:
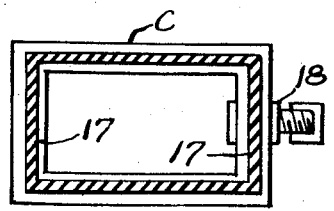

The brackets above described, namely as designated 5 and 7, is the mounting means, between which the air spring units, three as illustrated, are mounted in tiered relation, a bottom one A, an intermediate one B, and an upper one C, the units being placed one above the other, the lower or upper outside surface of one contacting the adjacent lower or upper surface of another, that is throughout the intermediate length, say fifteen to twenty inches, of the air spring units. Each of the said units, A, B, C, is a unit which is formed of a cord or textile woven base together with a rubber material encasing the cord or textile base and being vulcanized thereto in the manner in which rubber pneumatic tires are made, or in any manner which is suitable for the construction of the unit. The woven or textile base may be formed of any fibrous material such as cotton, or rayon, or nylon, or other material, and this base is formed to surround the interior air space designated 13 in each unit, giving tension strength to the unit, so that the unit may be sufficiently strong to contain a comparatively high pressure of air in the space 13, without unduly expanding in the cross sectional area or distorting of the shape by such expansion. Each unit has at each of its ends a part 14 which closes the space 13 at that end, this part 14 being also a securing section of the unit (one at each end) by which the unit may be supported at each end and held in place by bolts 15 which are inserted through holes 16, one hole 16 being formed in each end of the unit. The cord or textile base may be extended through the ends so as to strengthen the ends, the cross sectional representation designated as 17, in Figure 6, being representative of the cord or textile base as constructed in the unit, as may be necessary for strength. In Figures 5 and 6, and likewise in the other figures, the rubber material forming the units is shown, as of the form which it preferably should have, and it should especially be noted that these units are formed of rubber or any such synthetic material as may serve the purpose of rubber, for flexibility. The contemplation is, that the units A, B, and C, are constructed of a rubber or similarly flexible material, such as will serve the purpose. The representation is diagrammatic to show the form, the material being as is described herein. Each unit A, B, C, is in its cross-section, substantially rectangular in shape as is shown in Figure 6, and also in Figure 3.

Each unit A, B, C, has a tire valve such as designated 18, in Figures 5 or 6, or in the alternative, as is shown in Figures 1, 2, 3, an inserted and secured tube 19, the extension 20 thereof being flexible and serving to connect each of the three units, that is their spaces 13, to a connecting union 21 and common tube 22 by which the spaces 13 are all connected to the unit M which is a diagrammatic representation of a variable pressure unit, reservoir or pump or other means by which air or gaseous fluid, may be supplied under a variable and controlled pressure. Such means to supply a variable and controlled pressure is known in the industry and commonly used, and it is therefore diagrammatically illustrated only, the invention being in the other means illustrated, and not in the variable pressure supply means.

In the assembly of my device with an automobile chassis, the units A, B, C, are first deflated, so there is no greater pressure than atmosphere in spaces 13. The chassis frame is lifted by any means as a hydraulic jack means, so the axle 2 is relatively low. The unit C is first placed in position, its ends being secured by the bolts 15, one at each end.

When the unit C has been placed and secured, the intermediate unit B is placed and secured, similarly, bolts 15 being inserted in the holes 16 of the unit. After the unit B has been secured, the unit A is then similarly secured by bolts 15 in holes 16 of the unit. Each unit is then secured at each of its ends. The tubes 19 and their extensions 20 are secured in place as any such means in tires or similar rubber pneumatic devices, are secured in place. In placing the units, the upper edges at the sides of the unit C should be placed between the flanges 9 of the bracket 5, and the other units should be placed between the retaining guides 12, as is the unit C also. After such placing of the units, the variable air pressure device M is caused, by its control means, to force air under pressure or other gaseous fluid, into the spaces 13, of the units, so that all are similarly inflated under pressure, and to a prescribed pressure which is sufficient, or to the pressure which the unit M automatically determines, such means being well known to be used to cause pressure flow according to the need for pressure and the weight carried by vehicles.

When the units A, B, C, are properly inflated, the units will have an air pressure in spaces 13, which may, according, to the weight of the vehicle, its load, and according to the size of the particular construction of units A, B, C, be say fifteen, twenty, fifty or even more pounds, as may be determined to be necessary, in the particular construction. The device, as assembled with the wheel 4, will then be in condition for use as the spring means in a vehicle. Each other road wheel of the vehicle, four or three, or as many as there may be, may have similarly constructed spring devices, containing the units A, B, C, or one or more such units, and each of these devices, of each wheel, may be similarly connected for air pressure flow and control, as is the device shown.

In use as a spring means, when obstructions are struck by the associated road wheel 4, the units A, B, C, will give upwardly from the bottom of the set, as may be necessary, such upward give or compression being say three or four inches, or any suitable distance, when maximum upward compression occurs. In such upward compression of the units, between the bracket 5 and the bracket 7, the guides 12, between which are the units, will retain the sides against too much outward bulge, and will also guide them upwardly and downwardly, as they are compressed, the guides 12 being each placed as much away from the units, as may be determined to be necessary for that function, without, on the other hand, hindering that compression. In compression, the securing or anchoring of the units at each of their ends by the bolts 15, will ensure that the units are at all times kept substantially in their relative positions, tiered upwardly, while still permitting the upward compression.

While I have shown the device as having three of the units, A, B, C, I contemplate that the device, in some constructions, may have more units, and in others, may have less, as for instance, some constructions, may have only two units in each device, and in some, it may be considered that only one unit, such as C, but of larger cross section, transversely, with a larger cross-section of space 13, comparatively, in proportion to the load of the chassis, will be sufficient to provide a proper resiliency. In the latter case, the wall of the unit would be made relatively stronger, and the cross-section of a unit, throughout the length of the space 13, may be as much as eight or ten or even more inches on a side. In case only one unit is used, the cross-section of the unit may be circular, instead of square as shown, or rectangular, in shape, as the brackets, on their contacting surfaces may then have any shape, such as a part-circular or, that is, as a sector of a circle, contacting the adjacent side of the unit. Such use of a single unit is not especially shown, as that is contemplated to be within the contemplation as shown and illustrated, the alteration being merely the elimination of one or two of the units, that is the lower or the lower two.

The use of the word "gas" in the claims is intended to contemplate and include any gaseous fluid such as air, or any gaseous material; the words "flexible material" is contemplated to include any material as rubber, or synthetic material having similar characteristics of flexibility and gas retention; the words "fixed securely" are contemplated to means secured in any manner directly or indirectly with; especially as meaning through the vehicle frame; the words "fixed adjacent—and substantially rigid therewith" are contemplated to mean secured in any manner directly or indirectly with (as through the vehicle frame) so as to move substantially rigidly therewith.

While I have shown and described particular detailed devices in the illustration of my invention, I contemplate that other detailed devices and combinations of devices, may be used in the realization of my invention, without departing from the spirit and intention thereof.

What I claim is:

1. In a yieldable support means for a vehicle: an axle unit associated with the vehicle and rotatably mounting a wheel on the vehicle; a shelf fixed on the vehicle, a second shelf fixed on the axle unit, the said shelves being substantially horizontal and parallel each to the other and vertically tiered; a pair of container mounting elements fixed securely with the first named one of said shelves and located horizontally remote each from the other and with the first named shelf intermediately thereof; an elongated gas container formed of a flexible material and having a wall formed to surround a gas space therewithin the wall enclosing the gas space on all sides, and having at each of two horizontally opposite ends of the elongated container a securing part formed therewith in the extended container end; a securing means for each said securing part affixing the securing part to one of said container mounting elements so that said securing parts are horizontally and remotely located each away from the other with gas container extended substantially horizontally and intermediately of said container mounting elements and vertically tiered between said shelves; other container mounting elements fixed with one of said shelves and at least one other gas container substantially similarly formed with space and securing parts, one securing means at each end of said other gas container to secure the two opposite ends to the other container mounting elements so that the other gas container is mounted in tiered relation with said first named gas container and extended horizontally between said other container mounting elements and between said first named gas container and one of said shelves; and a guiding means formed vertically at each side of said tiered gas containers and fixed to one of said shelves and spaced laterally away from the tiered gas containers to permit some lateral extension of the gas containers but to restrain the gas containers and retain them in the tiered relation.

2. In a yieldable supporting means for a vehicle: a rotatable wheel for the vehicle and an axle unit associated with the vehicle and rotatably mounting the wheel on the vehicle; a shelf fixed on the vehicle, a second shelf fixed on the axle unit, the said shelves being substantially horizontal and parallel each to the other and in vertically tiered relation; a pair of container mounting means, one fixed adjacent one end of the first named shelf and substantially rigid therewith, and the other fixed adjacent the other end of said first named shelf and substantially rigid therewith, said container mounting means being located horizontally remote each from the other; a plural number of gas containers each formed of a flexible material and having a gas space within its enclosing wall and having at each of two horizontally opposite ends of the gas container a securing part formed therewith; a securing means for one said container mounting means securing one securing part of each said gas container thereto; a securing means for the other said container mounting means securing the other of said securing parts of each said gas container thereto; the said gas containers being by said pair of securing means mounted to extend substantially horizontally between said pair of container mounting means and in vertically tiered relation between said shelves.

3. The means as specified in claim 2, and; a guiding means formed at each of the sides of said tiered gas containers, the said guiding means being secured with one of said shelves and spaced laterally away from the tiered gas containers to permit some lateral extension of the gas containers but to restrain the gas containers and retain them in the tiered relation.

4. The means as specified in claim 2, and; each said securing part of each said gas container, having an aperture formed transversely of the securing part, and through which aperture the associated securing means is passed to be secured to the associated container mounting means.

5. In a yieldable supporting means for a vehicle: a rotatable wheel for the vehicle and an axle unit associated with the vehicle and rotatably mounting the wheel on the vehicle; a shelf fixed on the vehicle, a second shelf fixed on the axle unit, the said shelves being substantially horizontal and parallel each to the other and in vertically tiered relation; a pair of container mounting means, one fixed adjacent one end of the first named shelf and substantially rigid therewith, and the other fixed adjacent the other end of the said first named shelf and substantially rigid therewith, said container mounting means being spaced apart and horizontally remote each from the other; a gas container of elongated form, constructed of a flexible material with reenforcing material embedded therein, having at each end an integral securing strap, having intermediately of said securing straps a gas space internally of an enclosing and surrounding wall; a securing means for one said container mounting means securing one securing strap of said gas container thereto; a securing means for the other said container mounting means securing the other of said securing straps of said gas container thereto; the said gas container being by said pair of securing means mounted to extend substantially horizontally between said pair of container mounting means and in vertically tiered relation between said shelves.

6. In a yieldable support means for a vehicle: a rotatable wheel for the vehicle and an axle-unit mounting the wheel on the vehicle; a saddle unit having rigid mounting with the vehicle frame adjacent the axle-unit, the said saddle unit having an elongated form substantially horizontally disposed and extending in direction transversely of said axle-unit; a shelf unit formed on the axle-unit and having an elongated form horizontally disposed and extending in direction transversely of said axle-unit and in vertically tiered relation with said saddle-unit; a pair of mounting elements rigidly fixed with the vehicle frame and remotely spaced apart each from the other and to be one adjacent one end of the saddle unit and one adjacent the other end of the saddle unit; the said saddle unit and shelf unit being spaced apart and substantially parallel each to the other; a gas container having an enclosing wall formed of flexible material and having an elongated form and an elongated gas space within the enclosing wall and surrounded thereby and having a pair of securing straps formed therewith and extended one from one end of the gas container and the other from the other end of the gas container; means at each end of the gas container transversing the securing strap and securing the securing strap to one of said pair of mounting elements so that the gas container is extended by said securing straps horizontally and intermediately of said pair of mounting elements and between said saddle unit and said shelf unit in tiered relation therewith.

7. The means as specified in claim 6, and: the said gas container having its said enclosing wall and its said securing straps formed to have tension resisting reenforcing material embedded in the flexible material to thereby strongly suspend the gas container between said mounting elements.

8. A gas container for cushioning of a vehicle, constructed of a flexible material with reenforcing tension resisting material embedded in the flexible material, having an elongated form, having at each end of the elongated form a strap, having intermediately of the pair of straps a wall enclosing and surrounding a gas space internally of the wall; the said straps having each formed transversely thereof an aperture and forming each means by which the gas container may be suspended to have said gas space and its enclosing wall intermediately of the pair of straps.

9. In a yieldable support for a vehicle: a rotatable wheel for the vehicle and an axle unit mounting the wheel on the vehicle; a pair of support elements, one being a saddle having rigid mounting with the vehicle frame adjacent the axle unit, said saddle having an elongated form substantially horizontally disposed and the other of said support elements being a ledge formed on the axle unit and having an elongated form substantially horizontally disposed; a pair of mounting elements rigidly fixed with one of said support elements and remotely spaced apart each from the other and to be one adjacent one end of the support element and the other adjacent the other end of the support element; the said support elements being spaced apart and substantially parallel each to the other; a gas container constructed of a flexible material with reenforcing tension resisting material embedded in the flexible material, having an elongated form, having at each end of the elongated form and extended therefrom a securing strap, having intermediately of the pair of securing straps a wall enclosing and surrounding a gas space internally of the wall; a pair of securing means each associated with one of said mounting elements and one of said pair of securing straps to attach said gas container by said straps to said pair of mounting elements so that the gas container is extended by said securing straps horizontally and intermediately of said pair of mounting elements and between said pair of support elements in tiered relation therewith.

References Cited in the file of this patent

UNITED STATES PATENTS

| | | |
|---|---|---|
| 1,107,311 | Klenke | Aug. 18, 1914 |
| 1,445,486 | Cats | Feb. 13, 1923 |
| 1,915,304 | Forsyth | June 27, 1933 |
| 1,991,184 | Towner | Feb. 12, 1935 |

FOREIGN PATENTS

| | | |
|---|---|---|
| 657,309 | France | Jan. 15, 1929 |
| 664,698 | France | Apr. 29, 1929 |